(No Model.)
A. R. PENNINGTON.
FERTILIZER DISTRIBUTER.
No. 255,015. Patented Mar. 14, 1882.
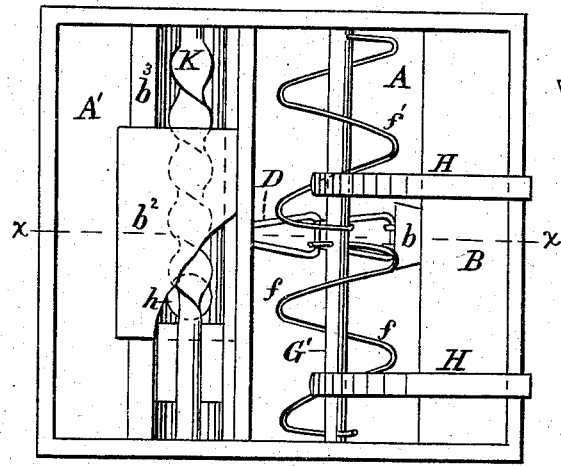
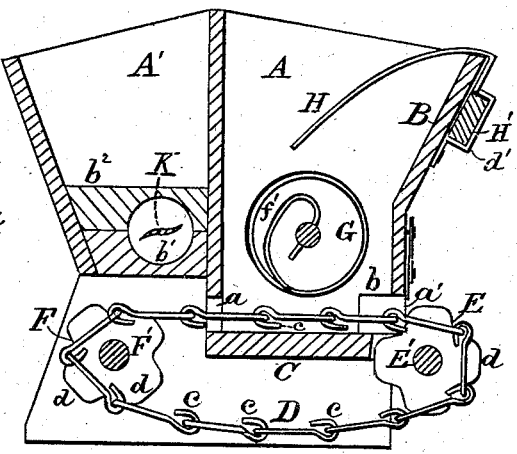
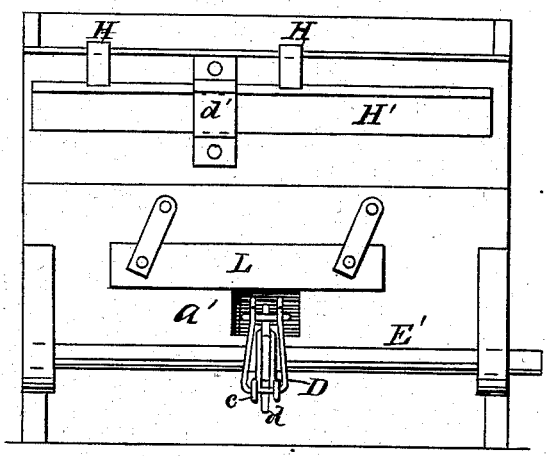
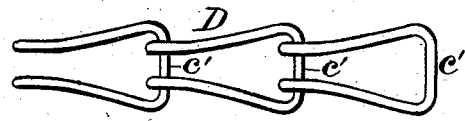
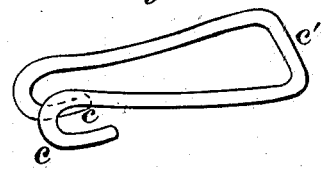
Witnesses:
G. B. Fowles
H. A. Daniels
Inventor:
Albert R. Pennington
By W. Burris
Attorney.

UNITED STATES PATENT OFFICE.

ALBERT R. PENNINGTON, OF MIDDLETOWN, DELAWARE.

FERTILIZER-DISTRIBUTER.

SPECIFICATION forming part of Letters Patent No. 255,015, dated March 14, 1882.

Application filed December 6, 1881. (No model.)

*To all whom it may concern:*

Be it known that I, ALBERT R. PENNINGTON, of Middletown, in the county of New Castle and State of Delaware, have invented certain new and useful Improvements in Fertilizer-Distributers; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to an endless-chain fertilizer-distributer; and the invention consists in the novel construction, arrangement, and combination of the devices, as hereinafter fully described.

In the drawings, Figure 1 is a plan view. Fig. 2 is a vertical section on line $x\,x$ of Fig. 1. Fig. 3 is a back elevation of the fertilizer-distributer. Figs. 4 and 5 are views of several links of the chain detached.

A A' designate the hoppers of the fertilizer-distributer and screw-conveyer respectively. When the hopper A is full the downward pressure tends to pack to some extent the phosphate and to cause the agitator, hereinafter described, to work heavily. To avoid this the upper portion, B, of the rear wall of the hopper is inclined outward, as shown in Fig. 2 of the drawings, which inclination serves to lessen the pressure upon the agitator.

The hopper A is provided with an iron bottom, C, front and rear openings, $a\,a'$, and a flaring hood, $b$, over the rear opening, $a'$.

D is an endless chain, carried through the openings $a\,a'$, from front to rear, over the iron bottom C of the hopper by the sprocket-wheels E F, mounted on the shafts E' F', having suitable bearings. The links of the chain are made of uniform lengths, and the two ends of each side of the link are bent, as shown, forming the two hooks $c\,c'$, and the other end of each link is shaped so as to form the straight cross part $c'$, over which the ends $c$ are hooked, thus connecting the links of the chain together, with the ends $c$ extending inward and inclined in the direction of the movement of the chain, in position, when in operation, to scrape upon the bottom C of the hopper to prevent the packing of the phosphate on the bottom under the chain.

The sprockets or projections $d$ on the wheels are made nearly as wide as the length of the links and long enough to project through the links, as shown in Figs. 1 and 2 of the drawings, to clear the chain of the phosphate.

G is an agitator formed of two spiral rods, $f\,f'$, arranged on a shaft, G', adjusted on suitable bearings to revolve in the lower part of the hopper A over the endless chain. These rods may be held in place by means of spiders adjusted on the shaft, or by having their ends extended through and fastened in holes in the shaft, as shown in the drawings, and the rods are shaped and arranged on the shaft so as to form two reverse screw stirrers and conveyers, moving the materials from the ends toward the center over the chain.

The chain is adjusted to run crosswise from front to rear through the hopper, conveying the materials through the rear opening, $a'$, into a trough provided with a discharge-spout, (not shown,) so that the operator may readily see that the distributer is working properly.

The fertilizer-hopper is provided with a stirrer consisting of the arms H H, extended over the edge of the wall B and downward into the hopper, over the agitator, and attached at the outer ends to a slide-bar, H', arranged to slide back and forth in guides $d'$, attached to the back of the wall B. This stirrer may be operated by means of an upright rock-shaft connected at one end with the slide-bar H' and at the other end with a cam, crank, or eccentric on the main driving-axle, or by any other suitable mechanism.

K is a screw-conveyer adjusted in the semi-cylindrical bottom $b'$ of the hopper A', provided with a cover, $b^2$, the under side of which is semi-cylindrical, forming, with the bottom, a cylindrical passage. Heretofore this kind of a conveyer has been adjusted in a passage of so nearly the same diameter as to crush the seeds or grain caught between the conveyer and the walls of the passage. The novelty of this part of my invention consists in making the passage enough larger than the conveyer to allow the grain to pass between them without the liability of being crushed. The cover $b^2$ does not extend the entire length of the conveyer, leaving an opening at $b^3$ for the grain to descend into the conveyer-passage, the bottom of which is provided with discharge-openings, as shown at $h$, leading to discharge-spouts.

L designates an adjustable gate, arranged on the outside over the discharge-opening $a'$, to regulate the feed of the materials from the hopper A to the receiving-trough. (Not shown.)

It is evident that the above-named devices of the fertilzer-distributer and of the screw-conveyer may be operated by any suitable cog-gearing, or by means of belts or chains attached to and connected with the devices and with the main driving-axle of the machine.

The devices shown and herein described represent one set only of a series of similar devices, any required number of which may be employed on a single machine.

What I claim, and desire to secure by Letters Patent, in a fertilizer-distributer, is—

1. In combination with the hopper of a fertilizer-distributer, the endless chain D, composed of links having the hooked projecting ends $c$, the chain being adjusted to run transversely through the hopper, with the projecting ends of the links inclined toward the bottom of the hopper and in the direction of the movement of the chain, substantially as and for the purposes described.

2. The combination, with the force-feed chain D, of the reverse screw conveyers and agitators, consisting of the spiral rods $ff'$, arranged reversely on the revolving shaft $G'$, adjusted to convey the fertilizers from each end to the middle of the hopper, over the chain, substantially as and for the purposes described.

3. The stirrer consisting of the arms H H, extended into the hopper A, over the agitator, and attached to the bar $H'$, adjusted on the outside of the wall of the hopper to be reciprocated by mechanism substantially as and for the purposes described.

4. The stirrer consisting of the arms H H, extended into the hopper A and attached to the bar $H'$, adjusted on the outside of the wall of the hopper, in combination with the force-feed chain D, and the reverse screw conveyors and agitators, consisting of the spiral rods $f$ $f'$, arranged reversely on the revolving shaft $G'$, substantially as and for the purposes described.

In testimony that I claim the foregoing as my own invention I affix my signature in presence of two witnesses.

ALBERT R. PENNINGTON.

Witnesses:
S. L. CHAMBERLAINE, Jr.,
D. L. DUNNING.